(No Model.) 2 Sheets—Sheet 2.
W. H. MYERS.
SAW SHARPENER.
No. 570,225. Patented Oct. 27, 1896.
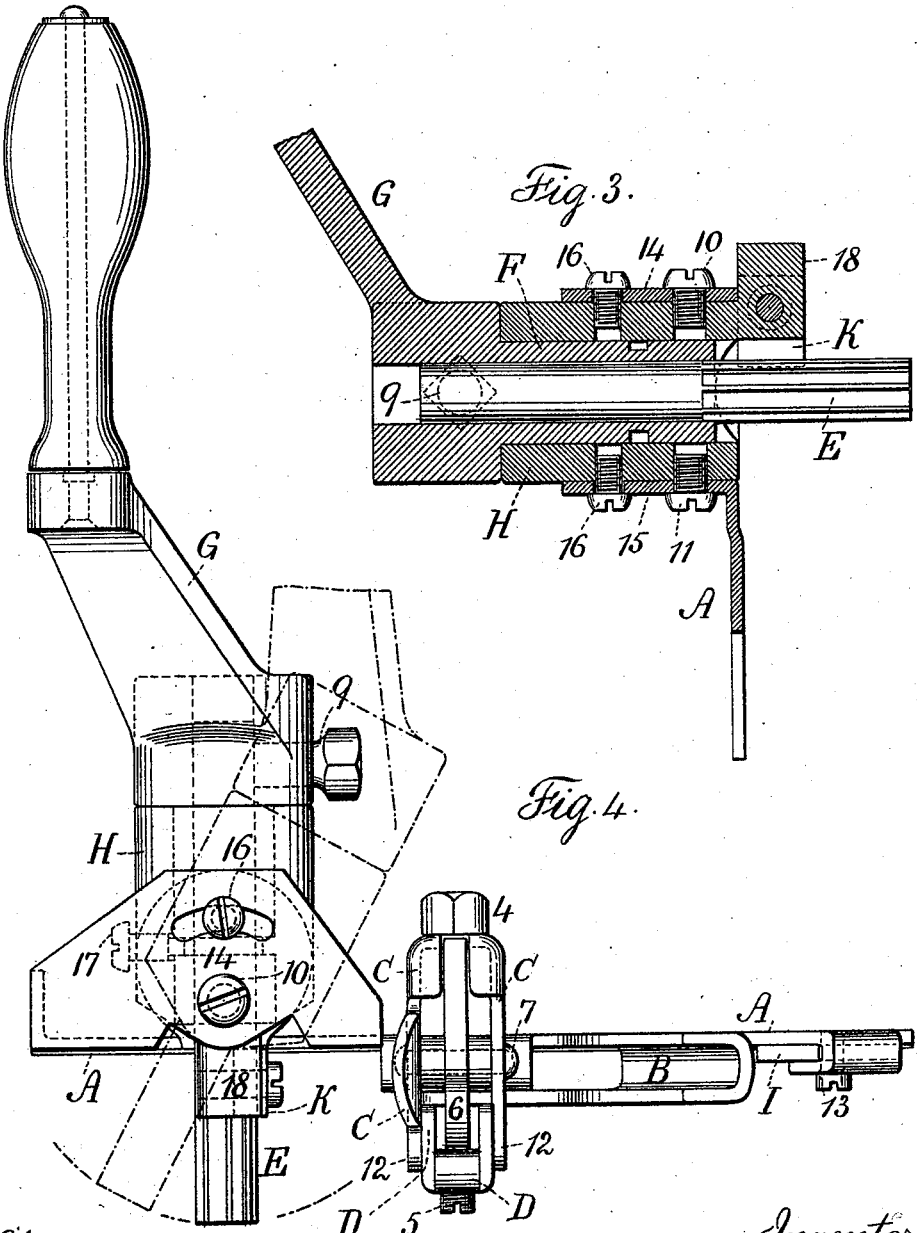

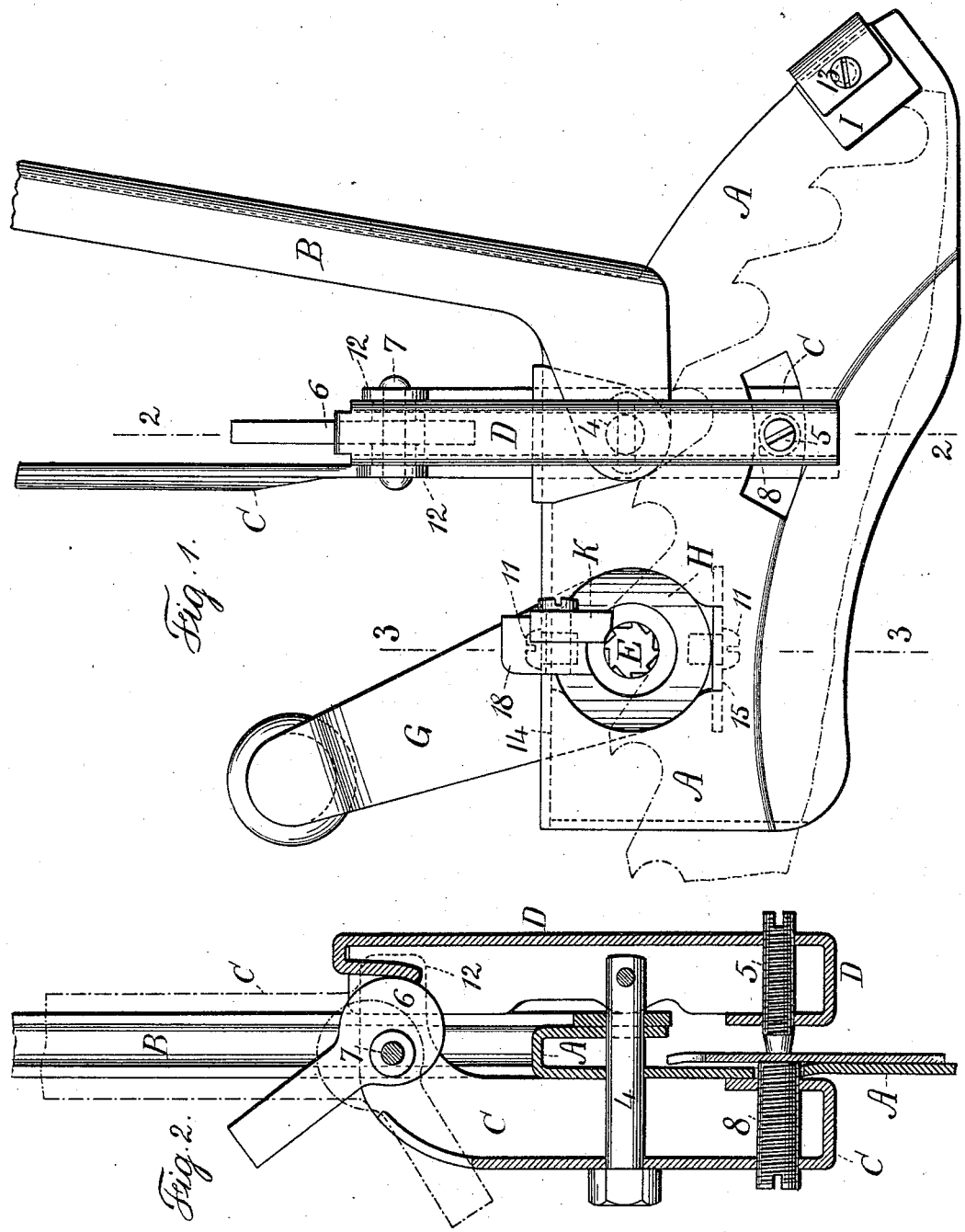

UNITED STATES PATENT OFFICE.

WILLIAM H. MYERS, OF BROOKLYN, NEW YORK, ASSIGNOR TO JOHN G. MOORE, OF NEW YORK, N. Y.

SAW-SHARPENER.

SPECIFICATION forming part of Letters Patent No. 570,225, dated October 27, 1896.

Application filed July 20, 1896. Serial No. 599,794. (No model.)

*To all whom it may concern:*

Be it known that I, WILLIAM H. MYERS, a citizen of the United States, residing at Brooklyn, in the county of Kings and State of New York, have invented an Improvement in Saw-Sharpeners, of which the following is a specification.

Saw-sharpeners have been made in which a rotary milling-tool is made use of within the throat of a saw-tooth, the saw being clamped and pressed against the milling-tool as the latter is revolved by hand, and these sharpeners have been adapted to either circular or straight saws. I have discovered an inconvenience in the use of saw-sharpeners of the before-named description in applying the clamping-screw to the saw, because such clamping-screw is liable to wear loose in consequence of having to be actuated for every tooth that was sharpened, and in addition to this the surface against which the saw is clamped is liable to become worn and out of true with the surface of the base or plate carrying the parts, and the machines of this character are not easily changed so as to attach the milling-tool to a straight ripping-tooth or to an angular cross-cut tooth.

In the present improvements the apparatus is adapted to different thicknesses of saws by an adjusting-screw. The pressure upon the saw when changed from one tooth to the other is effected by a cam, and the saw is clamped against the flat end of a screw which may be adjusted to compensate wear, and it may be ground flat from time to time if the surface becomes injured, and the milling-tool and its shaft are mounted in a pivoted stock having beveled ends, so that the milling-tool can be held perpendicular to the plane of the saw or at an acute angle to the same in either one direction or the other, thus adapting the sharpener to straight teeth or to beveled teeth for cross-cut work.

In the drawings, Figure 1 is an elevation of the saw-sharpener. Fig. 2 is a cross-section at the line 2 2 of Fig. 1. Fig. 3 is a cross-section at the line 3 3 of Fig. 1, and Fig. 4 is a plan view.

The base-plate A is made with a rigid or integral projecting handle B, extending upward, and there is a compound presser-lever composed of the hand-lever C, pivoted at 4, and the clamp-lever D, into which the pivot-bolt 4 also passes, and the screw 5 is for adapting the compound presser-lever to different thicknesses of saws, and the upper end of the clamp-lever D is guided between the ears 12, that project from the hand-lever C, and upon this hand-lever the cam 6 is pivoted at 7, preferably between the two sides of such hand-lever, and there is an adjusting-screw 8, passing through the lower end of the hand-lever C, and the end of this screw 8 is to be in line with or slightly projecting beyond the face of the base-plate A, and when the cam 6 is in the position shown in Fig. 2 the saw can be inserted between the screws 5 and 8 and the screw 5 turned until it firmly clamps the saw. This adjusts the parts according to the thickness of the saw, because when the cam 6 is turned by hand into the position shown by dotted lines in Fig. 2 the clamp-lever D is liberated from the saw, and the sharpener can be moved along upon such saw to bring the milling-tool to the next tooth, and by returning the cam 6 to the position of the full lines in Fig. 2 the saw is firmly grasped again, and when the hand is applied around the handle B and the hand-lever G and contracted the compound lever C is swung on its pivot and drawn toward the handle B, and the saw that is grasped between the screws 5 and 8 at the lower end of the compound lever C is forced toward the milling-tool, and at this time the milling-tool is to be revolved for sharpening the tooth.

It will be observed that the screw 8 passes through a segmental slot in the base-plate A, so that the movements before mentioned are permitted. It is advantageous to make use of a block of rawhide, as shown at I, the same being confined by a clamping-screw and plate 13 upon one side of the base-plate A, so that the block of rawhide will rest against the adjacent tooth of the saw when the sharpener is applied, it being understood that the rotary cutter is introduced into the throat of the tooth that is to be sharpened, the clamp 6 of the compound lever being loose, and this clamp is then tightened and pressure applied to force the saw against the rotary cutter while the same is being revolved, and the block of rawhide determines the relative positions of the parts, and this rawhide is not liable to injure or dull the points of the teeth by contact with the same.

There is an opening through the base-plate A with bearings 14 15, through which pass the pivot-screws 10 and 11, and the stock H is adapted to pass in between the bearings 14 and 15, and it receives the pivot-screws 10 and 11, advantageously screwed into the stock from opposite sides, so that this stock can be moved upon the pivot-screws into any desired angular position to the surface of the base-plate, and a screw 16, passing through a curved slot or quadrant in the base-plate A, is employed for holding the stock H in whatever position it may be placed. I have shown two screws 16 in curved slots.

The end of the stock that is next to the saw is rounded and beveled, so as not to come into contact with the saw when in either of the angular positions required for sharpening cross-cut teeth, and the milling-tool E is of a proper size to fit the throat of the saw-tooth and is advantageously parallel, so as to be projected more or less from the end of the shaft F, which is tubular for the reception of such milling-tool, and it is provided with a handle or crank G, by which the shaft and milling-tool can be rotated, and the screw 9 serves to clamp the milling-tool in whatever position it may be placed.

There is a screw 17, the point of which passes into a groove around the exterior surface of the shaft F for holding the shaft in its proper position within the stock H, but allowing the shaft and milling-tool to be revolved with facility.

The standing shear K is fastened to a lug 18 at the end of the stock H, and one end of this standing shear K is closely adjacent to the surface of the milling-tool E, so as to act with the same in cutting off the chips of metal as they are milled by the tool E, and in this manner the point of the tooth is made sharp for use in sawing.

In using this tool with straight teeth the stock H is to be clamped perpendicular to the face of the base-plate A, and when using the tool for sharpening bevel or cross-cut teeth the stock H is to be loosened and swung to any desired angle to the face of the base-plate A, and all the teeth having the corresponding angle or bevel are sharpened and then the parts loosened and the stock again set to the opposite angle for sharpening the other bevel-teeth. In each case the milling-tool should be set into the throat of the tooth with one or more of the other teeth of the saw resting against the rawhide guide I. The compound presser-lever at this time is loose and its upper end should be swung forward, the cam 6 brought into action to clamp the saw, and then while the milling-tool is rotated with one hand the compound presser-lever is acted upon by the other hand in forcing the saw toward the milling-tool, and such milling-tool will remove the metal at the throat of the saw and sharpen the same, bringing the point of the saw to a very keen edge between the milling-tool and the standing shear K.

It is advantageous to provide a separate stock, shaft, and handle for each size of milling-tool, because the milling-tool should fit tightly the tubular shaft F, and the size of this shaft F is sufficient to allow the bore of the shaft to be of a diameter corresponding to the size of the milling-tool, and when a different size of milling-tool is required the stock, shaft, handle, and milling-tool can be removed and another one replaced by loosening the screws 10, 11, 16, and 17 and removing the stock from between the bearings 14 and 15 and screws 10, 11, and 16.

The parts are represented as made principally of sheet metal cut out to shape and bent up, as the apparatus can be made light and strong and with but little handwork, but I do not limit myself in this particular, as the parts may be cast.

The pivot-bolt 4 is shown with a cross-pin for connecting it to the clamp-lever D and allowing such lever to swing on this cross-pin.

I claim as my invention—

1. The combination with a milling-tool and its shaft and stock, of a base-plate, a standing or rigid handle thereon projecting at one side of the base-plate, a presser-lever and a pivot for connecting the same to the stock, a clamp-lever pivoted to the presser-lever and adapted to act with such presser-lever in holding the saw, a cam for acting upon the clamping-lever and a screw for adjusting the pressure of the clamping-lever upon the saw, whereby the cam can be used in clamping or relieving the saw, independent of the adjusting-screw that adapts the tool to different thicknesses of saws, substantially as set forth.

2. The combination in a saw-sharpener, of a base-plate, a rigid handle extending out from the base-plate, a milling-tool for acting within the throat of the saw-tooth in sharpening the same, a compound lever having a handle and a clamp-lever, a pivot for connecting the handle and clamp-lever to the base-plate, screws for adjusting the parts and adapting them to varying thicknesses of saws to be sharpened, and a cam for applying pressure to the clamp-lever, substantially as set forth.

3. The combination with a base-plate and a presser-lever and clamp for acting upon the saw, of a milling-tool, a shaft and handle for actuating the same, a stock receiving the shaft, and pivots for supporting the stock and for allowing it to be moved with the milling-tool to any desired angular position to the face of the base-plate, substantially as set forth.

4. The combination with the base-plate having projecting bearings, of a stock having the ends beveled, a milling-tool and a tubular shaft for the same received within the stock, pivot-screws passing through the bearings and into the stock for connecting the stock to the base-plate, and a clamping-screw in a segmental slot for holding the parts at the desired angle substantially as set forth.

5. The combination with the base-plate having projecting bearings, of a stock having the ends beveled, a milling-tool and a tubular shaft for the same received within the stock, pivot-screws passing through the bearings and into the stock for connecting the stock to the base-plate, and a clamping-screw in a segmental slot for holding the parts at the desired angle, a standing shear and a supporting-lug upon the stock for acting with the milling-tool, substantially as set forth.

Signed by me this 9th day of July, 1896.

WILLIAM H. MYERS.

Witnesses:
GEO. T. PINCKNEY,
S. T. HAVILAND.